(No Model.)
J. J. CARTY & F. A. PICKERNELL.
TELEPHONE GAGE.
No. 495,180. Patented Apr. 11, 1893.
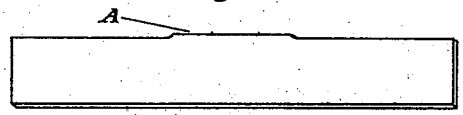
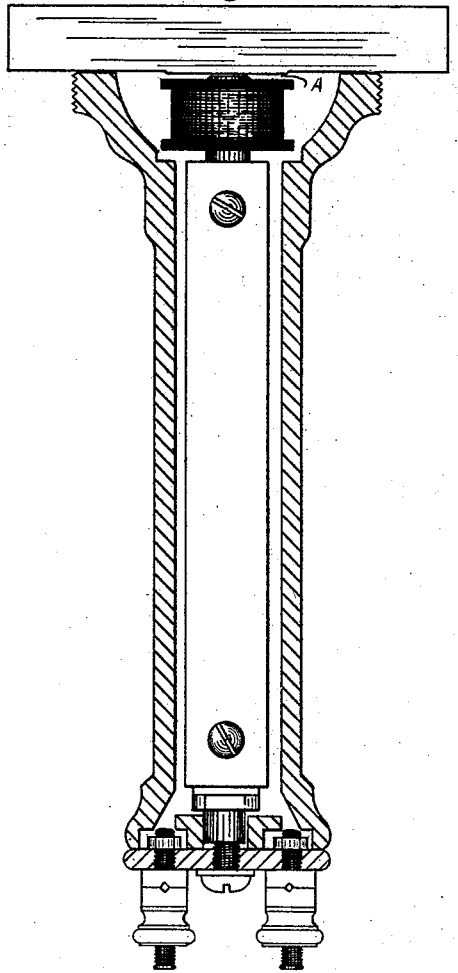
WITNESSES:
INVENTORS
John J. Carty
and Frank A. Pickernell
by Read & Price
their ATTORNEYS.

UNITED STATES PATENT OFFICE.

JOHN J. CARTY, OF NEW YORK, N. Y., AND FRANK A. PICKERNELL, OF NEWARK, NEW JERSEY.

TELEPHONE-GAGE.

SPECIFICATION forming part of Letters Patent No. 495,180, dated April 11, 1893.

Application filed August 31, 1892. Serial No. 444,693. (No model.)

*To all whom it may concern:*

Be it known that we, JOHN J. CARTY, residing in the city, county, and State of New York, and FRANK A. PICKERNELL, residing at Newark, in the county of Essex and State of New Jersey, citizens of the United States, have invented certain new and useful Improvements in Telephone-Gages; and we do hereby declare the following to be a full, clear, and exact description of the invention, such as will enable others skilled in the art to which it appertains to make and use the same.

The object of our invention is to provide a convenient testing instrument for the use of telephone inspectors or others, by the use of which it may be readily ascertained whether a telephone receiver is of standard character.

The invention comprises a gaging instrument composed of a piece of rigid material of sufficient length to span the mouth of the inclosing case when the end cap is removed, and of such weight that it will just be supported in the magnetic field when the latter is of standard strength.

Another feature of the device is a ridge or projection adapted to enter the magnet chamber and of a proper depth to touch the end of the magnet core when the latter is too close to the diaphragm.

The several features of novelty will be more particularly hereinafter described and will be definitely indicated in the claims appended to this specification.

In the accompanying drawings which illustrate the invention, Figure 1 is a perspective view of our gage. Fig. 2 is a sectional view of a telephone showing the manner of using the gage.

The device may be of any suitable shape, but we prefer to make it in the form of a flat strip, as shown in Fig. 1. Its length should be sufficient to bridge the diaphragm orifice when the ear piece of the telephone is removed, as indicated by Fig. 2. On one edge it is provided with a projection A adapted to enter the magnet chamber as indicated in Fig. 2, the projection being of such a height that it will not quite touch the pole piece of the magnet when the latter occupies the proper relation to the diaphragm. If during the service of the telephone or by reason of faulty construction the pole piece projects so far that the diaphragm will not have the proper freedom of movement, the gage when applied as indicated in Fig. 2 will indicate the faulty adjustment by touching the pole piece. Likewise if the pole piece is too far from the diaphragm it will be indicated when the gage is applied by the wide separation of the projection from the pole piece. A faulty feature often occurring in telephone receivers is an insufficient magnet strength, the power of the magnet being weakened by continued service, or being insufficient when the parts of the telephone are assembled. In order to indicate a fault of this character the bridge-piece or gage is formed of, or provided with, a body of magnetic material which will serve as an armature for the magnet, and the gage is made of such weight that when it is applied to the rim of the casing or shell a magnetic field of standard strength will just support it against the rim of the casing. Obviously the entire body of the gage may be formed of magnetic material such as iron, or such material may be secured to or mounted upon a bridge-piece formed of any other suitable material, the only requirement being that when the bridge-piece is applied to the rim of the casing it will serve as an armature for the magnet, and will be in inductive relation thereto, and that it be made of such weight that it will not be lifted by the field force if the latter is below standard strength. The portion of the gage which acts as an armature should be made of iron so as to avoid erroneous results which might arise if steel or other material capable of permanent magnetization were used. In making the test of field strength the gage should be applied with the broad face against the rim of the casing so that an air gap will exist between the telephone piece and gage. This will obviate the tendency to stick which will exist if the armature be brought directly in contact with the pole piece, and will therefore admit of a more delicate test. Moreover, by providing a diamagnetic separating medium between the armature and pole piece the gage may be made small in size and weight and is an easily portable instrument.

Having thus described our invention, what we claim as new, and desire to secure by Letters Patent, is—

1. A gage for testing telephones consisting of a piece of material of sufficient length to span the rim of the inclosing shell and adapted to be attracted by the magnet, the weight being such that a magnetic field of standard strength will just sustain it.

2. A gage for testing telephones consisting of an armature adapted to span the rim of the inclosing shell and of such weight that a magnetic field of standard strength will just sustain it.

3. A gage for testing telephones consisting of an armature adapted when laid across the pole piece of the telephone magnet to interpose a diamagnetic separating medium between the pole piece and the inductive portion of the armature, the armature being of such weight that a magnetic field of standard strength will just sustain it.

4. A gage for testing telephones consisting of an armature of a length to span the rim of the inclosing shell, the gage being of a weight that it will just be sustained in a magnetic field of standard strength, and provided with a projection of such a size that it will indicate a faulty adjustment of the pole piece to the diaphragm.

5. A gage for testing telephones consisting of an armature of a length to span the rim of the inclosing shell, the gage being of a weight that it will just be sustained in a magnetic field of standard strength and provided with a projection on one of its edges of sufficient depth to touch the pole piece when the magnet is too close to the diaphragm.

6. A gage for testing telephones consisting of a flat piece of iron adapted to span the rim of the inclosing shell and of such weight as to be sustained in a field of standard strength and provided with a projection A on one edge.

In testimony whereof we affix our signatures in presence of two witnesses.

JOHN J. CARTY.
FRANK A. PICKERNELL.

Witnesses as to J. J. Carty:
PAUL D. HONEYMAN,
JOHN BALL.
Witnesses as to F. A. Pickernell:
ALFRED E. HOLCOMB,
F. W. DUNBAR.